United States Patent [19]
Stursberg

[11] Patent Number: 5,203,198
[45] Date of Patent: Apr. 20, 1993

[54] WORKPIECE-POSITIONING APPARATUS

[75] Inventor: Bernd Stursberg, Ennepetal, Fed. Rep. of Germany

[73] Assignee: Rolf Peddinghaus, Ennepetal, Fed. Rep. of Germany

[21] Appl. No.: 852,634

[22] Filed: Mar. 17, 1992

[30] Foreign Application Priority Data

Mar. 20, 1991 [DE] Fed. Rep. of Germany ....... 4109028

[51] Int. Cl.⁵ .......................................... B21D 11/22
[52] U.S. Cl. ...................................... 72/461; 72/462; 83/462; 83/466; 269/78; 269/204
[58] Field of Search ...................... 269/77, 78, 99, 100, 269/204; 83/452, 462, 464, 466; 72/461, 481, 462

[56] References Cited

U.S. PATENT DOCUMENTS

| | | | |
|---|---|---|---|
| 3,964,360 | 6/1976 | Schwartz | 83/464 |
| 4,520,919 | 6/1985 | Keitaro | 72/462 |
| 4,880,221 | 11/1989 | Richards | 269/99 |

FOREIGN PATENT DOCUMENTS

| | | |
|---|---|---|
| 3507047 | 7/1987 | Fed. Rep. of Germany . |
| 3634255 | 4/1988 | Fed. Rep. of Germany . |

*Primary Examiner*—David Jones
*Attorney, Agent, or Firm*—Herbert Dubno; Andrew Wilford

[57] ABSTRACT

A workpiece-treating machine having a table with a pair of longitudinal edges and a working station between the edges has an apparatus for positioning a workpiece in the station which in turn has a generally square section metal tube extending along one edge of the table and formed with a longitudinally extending inner T-slot to which the one edge of the table is secured by T-fasteners, a pair of transversely spaced but longitudinally extending and upwardly open outer T-slots, and a pair of outwardly open and longitudinally extending outer T-slots. A longitudinally extending guide rod is supported at the one table edge by supports and T-fasteners that fix the guide rod on the table in the outwardly open T-slots at the one edge in a position extending parallel to the longitudinal edges. A carriage longitudinally displaceable along the guide rod is fixed to one end of an elongated traverse extending transverse to the longitudinal edges. A stepless-adjustment clamp on the carriage has a T-fastener engaged in one of the upwardly open T-slots for clamping the carriage on the tube at any position therealong and a toothed retaining element on the carriage engaged in the other upwardly open T-slot can arrest the carriage at any of a plurality of longitudinally offset positions therealong.

6 Claims, 2 Drawing Sheets

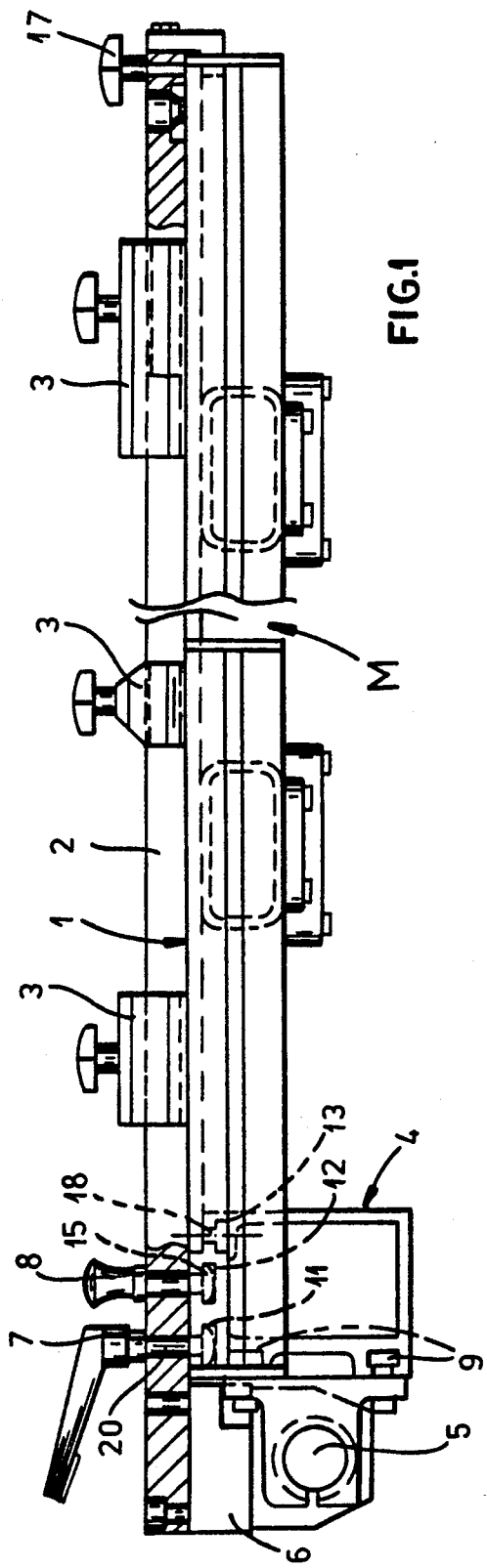
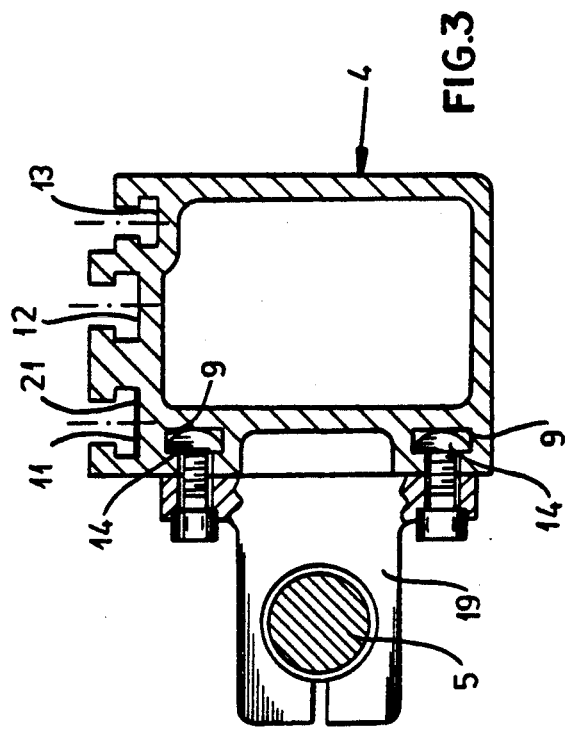

WORKPIECE-POSITIONING APPARATUS

FIELD OF THE INVENTION

The present invention relates to an apparatus for positioning a workpiece relative to a treatment station. More particularly this invention concerns positioning the workpiece on a table of a stamping machine or the like.

BACKGROUND OF THE INVENTION

Typically a workpiece is held on a stamping machine or the like between two or more clamp members mounted on an elongated traverse that extends transverse to and that can move in a longitudinal direction toward and away from a treatment station on a table of the machine. The traverse can be moved in the longitudinal direction to determine workpiece position in this direction. The stops can be moved in the transverse direction along the traverse for positioning the workpiece in the transverse direction.

German patent document 3,634,255 describes such a system. It has a round-section guide rod extending in the longitudinal direction along one longitudinal edge of the work table and the traverse is mounted at one end on a carriage that can slide along this rod. At its opposite end the traverse has a clamp that can solidly grip the corresponding table edge. In addition the table is provided adjacent the guide rod with a massive square-section bar formed with an upwardly open T-slot and a T-bolt or ratchet is fitted to the carriage so that the traverse can be latched along this edge of the table also. A double angle iron is fixed to this slotted bar to secure it to the table and the guide rod is also secured to this angle bracket.

Such an arrangement is fairly complicated and bulky. It is expensive to manufacture and difficult to assemble to the work table.

German patent 3,507,047 of P. Maier describes a stop arrangement for a table saw which has a complex metallic profile whose one end is secured to the table's miter slide and whose other end stands on a separate stand remote from the table to guide long workpieces. The dangling free end of this system is not stable enough for use with a stamping machine or the like, and in general it is not usable as a holder for a workpiece in this type of equipment.

OBJECTS OF THE INVENTION

It is therefore an object of the present invention to provide an improved workpiece-positioning apparatus for a machine like a stamper.

Another object is the provision of such an improved workpiece-positioning apparatus for a machine like a stamper which overcomes the above-given disadvantages, that is which is relatively simple and uncomplicated, yet which solidly and stably positions the workpiece adjacent the treatment station.

SUMMARY OF THE INVENTION

A workpiece-treating machine having a table with a pair of longitudinal edges and a working station between the edges according to this invention has an apparatus for positioning a workpiece in the station which in turn has a generally square section metal tube extending along on edge of the table and formed with a longitudinally extending inner T-slot in which the one edge of the table is seated, a pair of transversely spaced but longitudinally extending and upwardly open outer T-slots, and a pair of outwardly open and longitudinally extending outer T-slots. A longitudinally extending guide rod is supported at the one table edge and T-fasteners fix the guide rod on the table in the outwardly open T-slots at the one edge in a position extending parallel to the longitudinal edges. A carriage longitudinally displaceable along the guide rod is fixed to one end of an elongated traverse extending transverse to the longitudinal edges. A stepless-adjustment clamp on the carriage has a T-fastener engaged in one of the upwardly open T-slots for clamping the carriage on the tube at any position therealong and a toothed retaining element on the carriage engaged in the other upwardly open T-slot can arrest the carriage at any of a plurality of longitudinally offset positions therealong.

This slotted tube therefore fulfills several functions, namely carrying the guide rod, acting as a track for the two clamps, and rigidifying the table edge. It eliminates the need for separate brackets or flanges to support the guide rod, and ensures that the guide rod is perfectly parallel to the clamp tracks.

In accordance with this invention the tube is formed as a single unitary piece with the slots, produced by extrusion. This ensures that the slots are perfectly parallel to each other.

The T-fasteners each include a T-bolt having a head engaged in the respective slot, or a bolt and a nut threaded on the bolt and engaged in the respective slot. A distance gauge is provided along at least one of outer slots.

BRIEF DESCRIPTION OF THE DRAWING

The above and other objects, features, and advantages will become more readily apparent from the following, reference being made to the accompanying drawing in which:

FIG. 1 is an end view of the apparatus of this invention;

FIG. 3 is a section taken along line III—III of FIG. 2.

SPECIFIC DESCRIPTION

Figure 2:
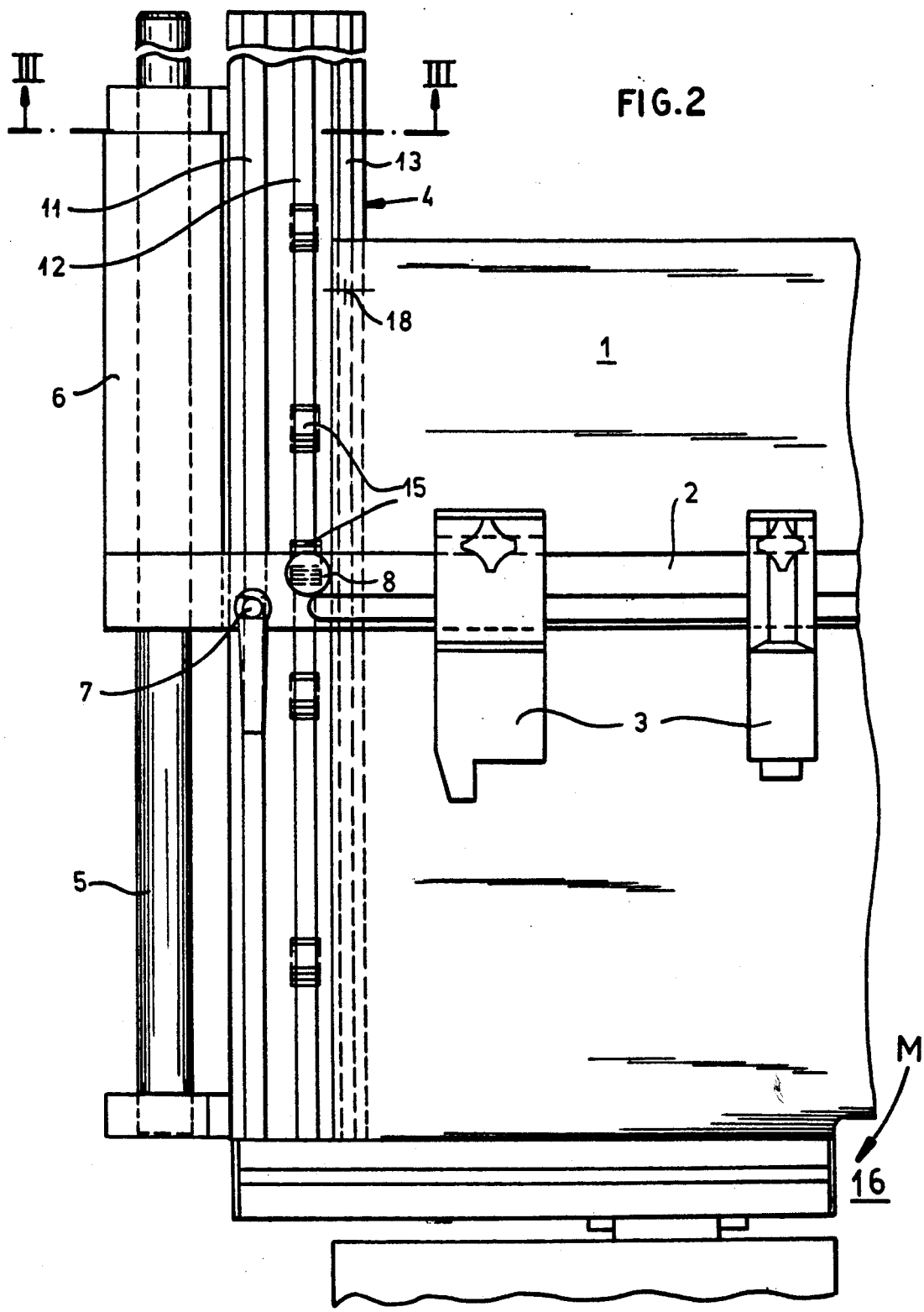
FIG. 2 is a top view of the apparatus.

As seen in FIGS. 1 through 3 the system of this invention is used on a flat and normally horizontally work table 1 having longitudinal edges extending perpendicular to the plane of the view in FIG. 1 and provided between these edges with a work station M, here provided with a only partially shown stamping device 16. A traverse bar 2 extends crosswise across the table 2 and has an outer end that can be secured by a clamp 17 to the outer longitudinal table edge. Workpiece holders 3 are provided along this traverse 2.

At its inner longitudinal edge the table 1 is secured by bolts 18 to a T-slot 13 of a square-section metal guide tube 4. An outer face of this tube 4 is formed with two outwardly open and vertically spaced but longitudinally extending T-slots 9 to which supports 19 for a longitudinal guide rod 5 are secured by more T-bolts 14. The traverse 2 has a carriage 6 that is fitted over and that can slide along this rod 5.

The tube 4 is also formed on its upper surface at a level somewhat above that of the slot 13 with two further T-slots 11 and 12 both extending longitudinally and opening at a surface of the tube 4 flush with the upper surface of the table 1. The slot 11 is engaged by a T-bolt 20 of a stepless adjustment device 7 so that the traverse 2 can be arrested at any longitudinal position on the table 1. This slot 11 is provided with a gauge strip 21 so that the exact position of the traverse 2 can be read or set by means of this strip 21. The other slot 12 is provided with toothed inserts 15 engageable by a detent or catch 8 serving to arrest the traverse at any of a multiplicity of predefined longitudinally offset positions on the table 1.

Thus the single bar 4 serves several purposes:

1. It stiffens the respective edge of the table 1.
2. It provides a support for the guide rod 5 and eliminates the need for a separate support element therefore.
3. It acts a the track for the stepless adjustment device 7.
4. It acts as the track for the step-adjustment unit 8.

I CLAIM:

1. In combination with a workpiece-treating machine having a table with a pair of longitudinal edges and a working station between the edges, an apparatus for positioning a workpiece in the station, the apparatus comprising:

a generally square section metal tube extending along one edge of the table and formed with a longitudinally extending inner T-slot to which the one edge of the table is secured, a pair of transversely spaced but longitudinally extending and upwardly open outer T-slots, and a pair of outwardly open and longitudinally extending outer T-slots;

a longitudinally extending guide rod at the one table edge;

supports and T-fasteners fixing the guide rod on the table in the outwardly open T-slots at the one edge in a position extending parallel to the longitudinal edges;

a carriage longitudinally displaceable along the guide rod;

an elongated traverse extending transverse to the longitudinal edges and having one end fixed in the carriage and another end at the other table edge;

a stepless-adjustment clamp on the carriage having a T-fastener engaged in one of the upwardly open T-slots for clamping the carriage on the tube at any position therealong; and a toothed retaining element on the carriage engaged in the other upwardly open T-slot for arresting the carriage at any of a plurality of longitudinally offset positions therealong.

2. The workpiece-positioning apparatus defined in claim 1 wherein the tube is formed as a single unitary piece with the slots.

3. The workpiece-positioning apparatus defined in claim 1 wherein each T-fastener includes a T-bolt having a head engaged in the respective slot.

4. The workpiece-positioning apparatus defined in claim 1 wherein each T-fastener includes a bolt and a nut threaded on the bolt and engaged in the respective slot.

5. The workpiece-positioning apparatus defined in claim 1, further comprising a distance gauge provided along at least on of outer slots.

6. The workpiece-positioning apparatus defined in claim 1 wherein the inner slot is below the two outer slots.

* * * * *